(12) United States Patent
Chen

(10) Patent No.: US 12,032,275 B2
(45) Date of Patent: Jul. 9, 2024

(54) OPTICAL MODULE WITH REINFORCEMENT STRUCTURE AND PROJECTION DEVICE HAVING THE SAME

(71) Applicant: Coretronic Corporation, Hsin-Chu (TW)

(72) Inventor: Wei-Hao Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 112 days.

(21) Appl. No.: 17/570,357

(22) Filed: Jan. 6, 2022

(65) Prior Publication Data

US 2022/0252828 A1 Aug. 11, 2022

(30) Foreign Application Priority Data

Feb. 5, 2021 (CN) .......................... 202120334695.2

(51) Int. Cl.
| | | |
|---|---|---|
| G03B 21/14 | (2006.01) | |
| G02B 7/182 | (2021.01) | |
| G02B 26/08 | (2006.01) | |
| G03B 21/28 | (2006.01) | |
| H04N 9/31 | (2006.01) | |

(52) U.S. Cl.
CPC ......... *G03B 21/142* (2013.01); *G02B 7/1821* (2013.01); *G02B 26/0816* (2013.01); *G02B 26/0875* (2013.01); *G03B 21/28* (2013.01); *H04N 9/3188* (2013.01)

(58) Field of Classification Search
CPC .... G03B 21/142; G03B 21/28; G02B 7/1821; G02B 26/0816; G02B 26/0875; G02B 26/08; G02B 26/0833; G02B 26/101; G02B 26/105; G02B 26/108; H04N 9/3188

See application file for complete search history.

(56) References Cited

U.S. PATENT DOCUMENTS

| | | | |
|---|---|---|---|
| 9,891,431 B2 | 2/2018 | Kojima et al. | |
| 2008/0304017 A1* | 12/2008 | Chen | G02B 27/46 353/30 |
| 2010/0118278 A1* | 5/2010 | Kobayashi | G03B 21/14 353/38 |
| 2010/0309444 A1* | 12/2010 | Wu | G03B 21/28 353/101 |
| 2016/0370575 A1* | 12/2016 | Lin | G02B 26/085 |
| 2019/0196308 A1* | 6/2019 | Chang | G02B 26/085 |
| 2019/0278102 A1* | 9/2019 | Suter | G02B 27/646 |
| 2020/0159093 A1* | 5/2020 | Wakabayashi | G01D 3/0365 |
| 2020/0174246 A1* | 6/2020 | Wakabayashi | G03B 21/006 |

(Continued)

FOREIGN PATENT DOCUMENTS

CN 209842318 12/2019

*Primary Examiner* — Bao-Luan Q Le
(74) *Attorney, Agent, or Firm* — JCIPRNET

(57) ABSTRACT

An optical module includes a frame body and an optical element. The frame body includes at least one fixing portion, at least one frame portion, at least one shaft portion, and at least one reinforcement structure. The frame portion is connected to the fixing portion through the shaft portion. The reinforcement structure is connected to the frame portion and forms at least one fracture. The position of the fracture corresponds to the at least one shaft portion. The optical element is disposed in the frame portion. In addition, a projection device having the optical module is also provided.

20 Claims, 8 Drawing Sheets

(56) References Cited

U.S. PATENT DOCUMENTS

| | | | |
|---|---|---|---|
| 2020/0386986 A1* | 12/2020 | Chen | G02B 26/101 |
| 2021/0247671 A1* | 8/2021 | Wakabayashi | H02K 41/0356 |
| 2021/0294188 A1* | 9/2021 | Hsu | G02B 7/023 |
| 2022/0137492 A1* | 5/2022 | Chen | G03B 21/2066 |
| | | | 353/98 |
| 2022/0299848 A1* | 9/2022 | Ito | H04N 9/3105 |

* cited by examiner

OPTICAL MODULE WITH REINFORCEMENT STRUCTURE AND PROJECTION DEVICE HAVING THE SAME

CROSS-REFERENCE TO RELATED APPLICATION

This application claims the priority benefit of China application serial no. 202120334695.2, filed on Feb. 5, 2021. The entirety of the above-mentioned patent application is hereby incorporated by reference herein and made a part of this specification.

BACKGROUND

Technical Field

The disclosure relates to an optical module and a projection device, and more particularly to an optical module capable of adjusting the deflection angle of an optical element and a projection device including the optical module.

Description of Related Art

Generally speaking, an actuator is installed in a projector, and an image beam passes through glass on the actuator. When a driving element of the actuator is operating, a shaft portion of a frame body is twisted to make the glass carried by the frame body deflect back and forth rapidly and refract the image beam to another position through the glass, thereby enhancing the resolution of images projected by the projector. If the material of the frame body is metal, since metal is a material of uniform thickness, when the actuator is operating, a frame portion and the shaft portion of the frame body may both be deformed due to similar structural strength, thereby affecting the stability and response speed of the actuator. In view of this, some actuators have a reinforcement structure (such as a folding wall) on the frame portion of the frame body to increase the structural strength of the frame portion, so that deformation is concentrated at the shaft portion during operation of the frame body. However, this may lead to stress concentration on the shaft portion during operation of the frame body, and the shaft portion may become prone to fatigue damage due to excessive stress.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The disclosure provides an optical module and a projection device, in which a shaft portion of the optical module may avoid damage due to stress concentration.

Other objectives and advantages of the disclosure may be further understood from the technical features disclosed herein.

In order to achieve one or a part or all of the above or other objectives, an embodiment of the disclosure provides an optical module including a frame body and an optical element. The frame body includes at least one fixing portion, at least one frame portion, at least one shaft portion, and at least one reinforcement structure. The frame portion is connected to the fixing portion through the shaft portion. The reinforcement structure is connected to the frame portion and forms at least one fracture. The position of the fracture corresponds to the shaft portion. The optical element is disposed in the frame portion.

In order to achieve one or a part or all of the above or other objectives, an embodiment of the disclosure provides a projection device including a light source, a light valve, a projection lens, and an optical module. The light source is configured to provide an illumination beam. The light valve is configured to convert the illumination beam into an image beam. The projection lens is configured to project the image beam out of the projection device. The optical module is disposed between the light valve and the projection lens and includes a frame body and an optical element. The frame body includes at least one fixing portion, at least one frame portion, at least one shaft portion, and at least one reinforcement structure. The frame portion is connected to the fixing portion through the shaft portion. The reinforcement structure is connected to the frame portion and forms a fracture. The position of the fracture corresponds to the shaft portion. The optical element is disposed in the frame portion and located on a transmission path of the image beam.

Based on the above, in the optical module of the disclosure, the frame portion of the frame body has the reinforcement structure. Thereby, the structural strength of the frame portion is increased and deformation is concentrated at the shaft portion of the frame body during operation of the frame body, so that the optical module can have good operation stability and response speed. Moreover, the reinforcement structure has the fracture corresponding to the shaft portion, such that the structural strength of the frame portion in the position corresponding to the shaft portion avoids becoming too high compared with the shaft portion, thus avoiding stress concentration on the shaft portion during operation of the frame body. Therefore, the shaft portion is less prone to fatigue damage due to excessive stress.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
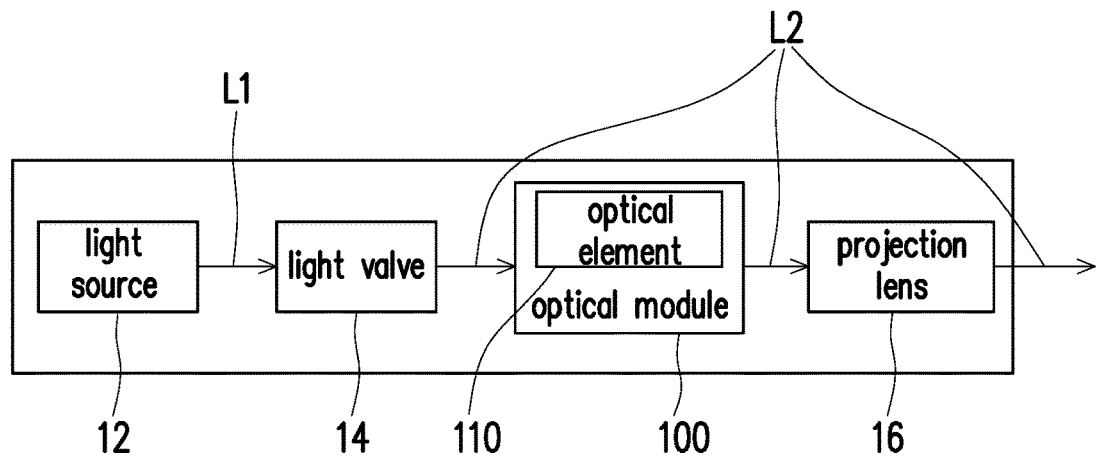
FIG. 1 is a schematic view of a projection device according to an embodiment of the disclosure.

FIG. 1 is a schematic view of a projection device according to an embodiment of the disclosure. With reference to FIG. 1, a projection device 10 of the embodiment includes a light source 12, a light valve 14, a projection lens 16, and an optical module 100. The light source 12 is configured to provide an illumination beam L1. The light valve 14 is configured to convert the illumination beam L1 into an image beam L2. The optical module 100 is disposed between the light valve 14 and the projection lens 16, and an optical element 110 of the optical module 100 is located on a transmission path of the image beam L2. The projection lens 16 is configured to project the image beam L2 out of the projection device 10. The optical module 100 may drive the optical element 110 to deflect back and forth rapidly and refract the image beam L2 to another position through the optical element 110, thereby enhancing the resolution of a projection image of the projection device 10.

Figure 2:
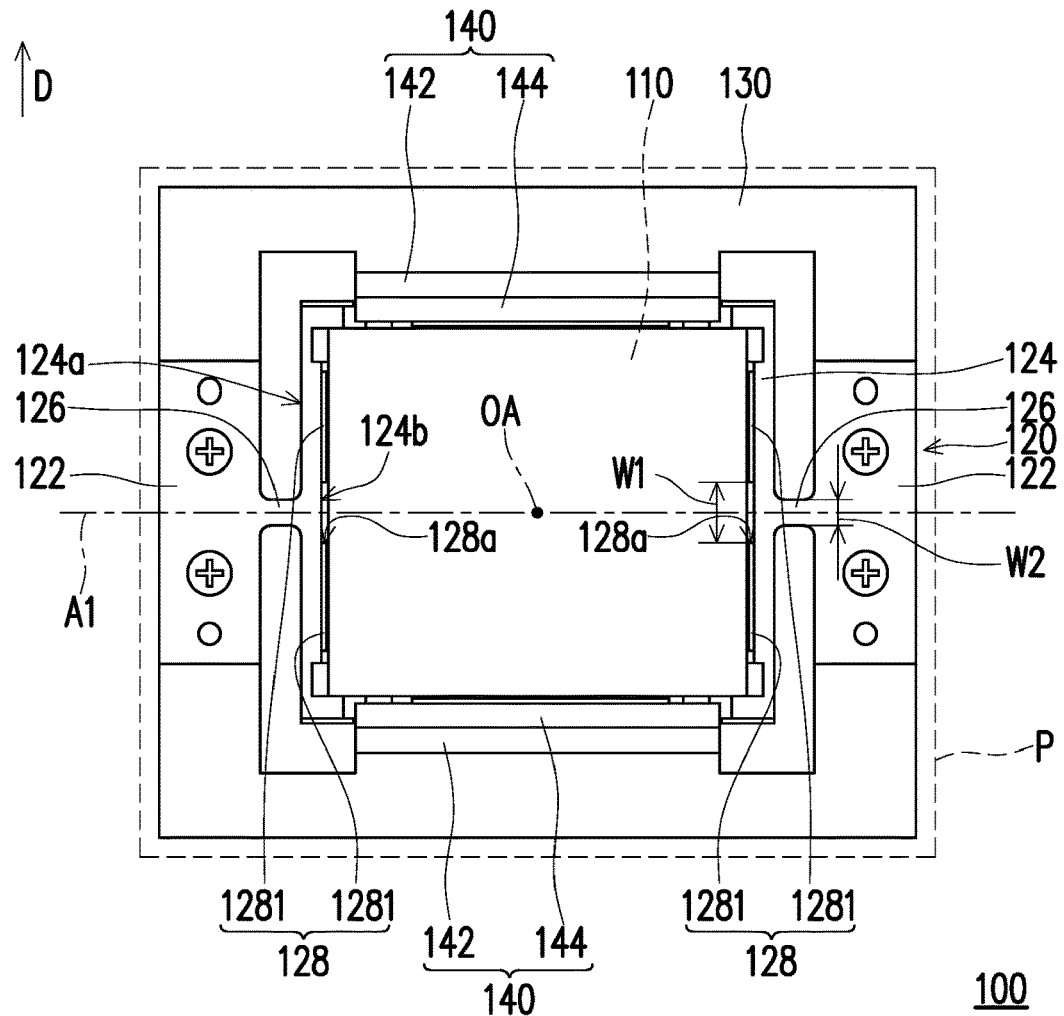
FIG. 2 is a top view of an optical module of FIG. 1.
Figure 3:
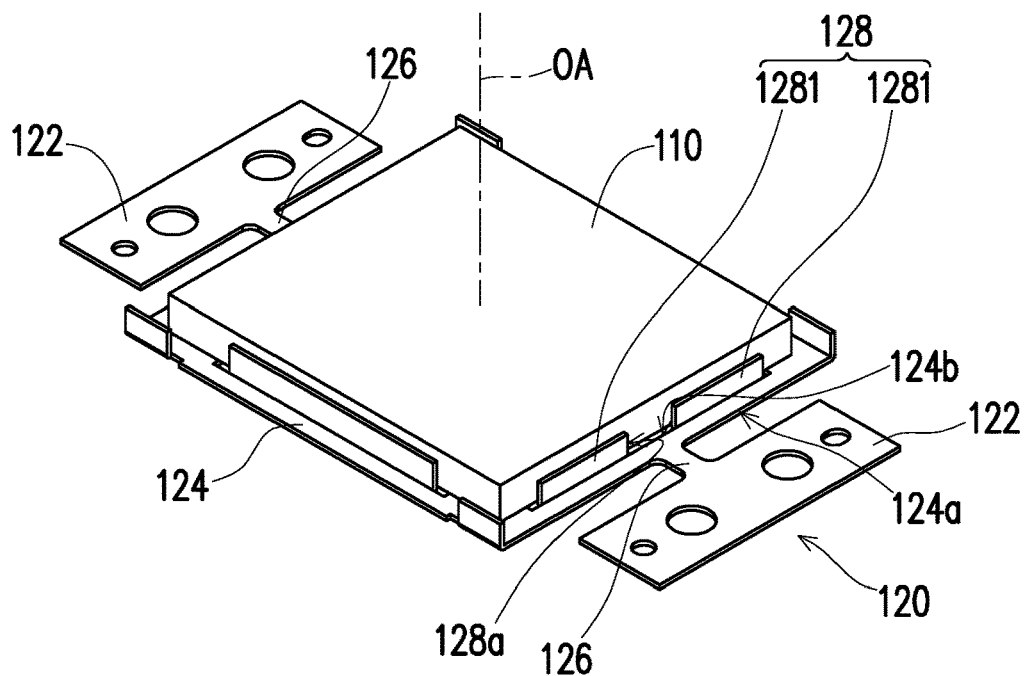
FIG. 3 is a perspective view of a frame body and an optical element of FIG. 2.
Figure 4:
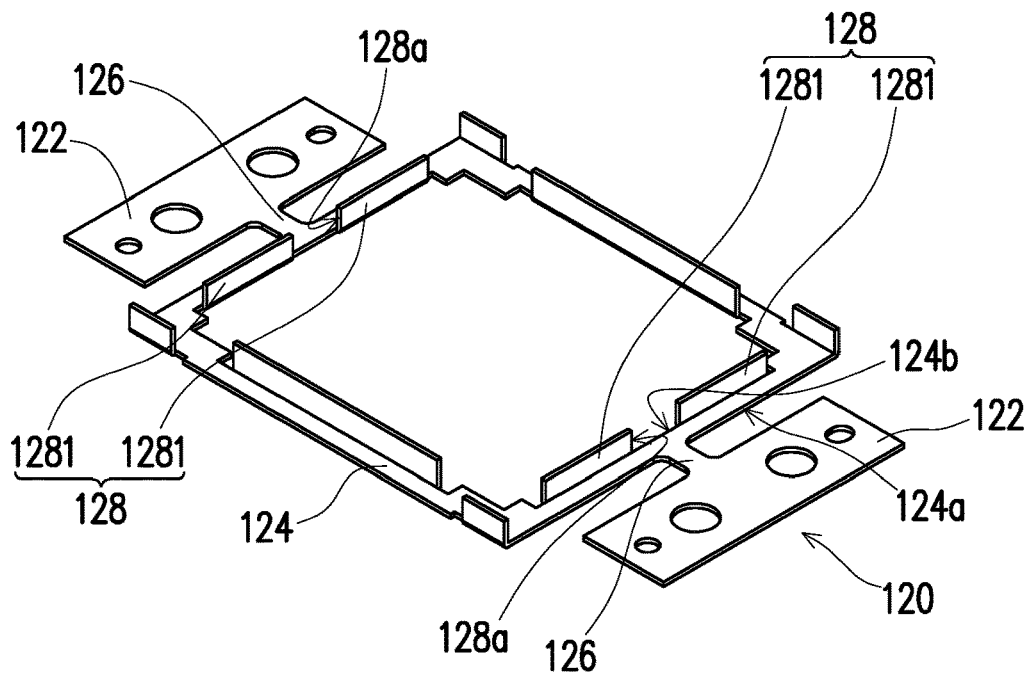
FIG. 4 is a perspective view of the frame body of FIG. 3.

FIG. 2 is a top view of the optical module of FIG. 1. FIG. 3 is a perspective view of a frame body and an optical element of FIG. 2. FIG. 4 is a perspective view of the frame body of FIG. 3. With reference to FIG. 2 to FIG. 4, the optical module 100 of the embodiment includes the optical element 110 and a frame body 120. In addition, the optical module 100 may further include a base 130 and at least one driving component 140. In the embodiment, for example, two driving components 140 are provided. The frame body 120 includes at least one fixing portion 122, at least one frame portion 124, at least one shaft portion 126, and at least one reinforcement structure 128. Furthermore, in the embodiment, the frame body 120, for example, is a sheet metal part and includes two fixing portions 122, one frame portion 124, and two shaft portions 126. The frame portion 124 is connected to the fixing portions 122 through the shaft portions 126, and the optical element 110 is, for example, disposed in the frame portion 124 by gluing or in other suitable ways. The base 130 surrounds the frame body 120, and the fixing portions 122 are connected to the base 130. The driving components 140 are disposed on the base 130 and the frame portion 124. The frame portion 124 is configured to deflect relative to the base 130 around a rotation axis A1 (shown in FIG. 2) through the two shaft portions 126 by a magnetic force generated by the driving components 140, in order to drive the optical element 110 to deflect back and forth rapidly as described above.

The frame body 120 of the embodiment, for example, includes two reinforcement structures 128. The reinforcement structure 128 is connected to the frame portion 124 and thereby forms a fracture 128a. The reinforcement structure 128 includes two sections 1281 arranged at intervals, and the fracture 128a is formed between the two sections 1281, with the position of the fracture 128a corresponding to the shaft portion 126. The disposition of the reinforcement structure 128 may enhance the structural strength of the frame portion 124 such that deformation is concentrated at the shaft portion 126 during operation of the frame body 120. Accordingly, the optical module 100 has good operation stability and response speed. Moreover, as described above, the reinforcement structure 128 has the fracture 128a corresponding to the shaft portion 126, such that the structural strength of the frame portion 124 in the position corresponding to the shaft portion 126 avoids becoming too high compared with the shaft portion 126, thus avoiding stress concentration on the shaft portion 126 during operation of the frame body 120. Therefore, the shaft portion 126 is less prone to fatigue damage due to excessive stress.

With reference to FIG. 2, in the embodiment, the rotation axis A1 is located on a plane P, and the plane P is perpendicular to an optical axis OA of the optical element 110. The reinforcement structures 128 are in the form of, for example, folding walls, and extend out from the frame portion 124 along a direction parallel to the optical axis OA of the optical element 110. Additionally, the two sections 1281 of the reinforcement structures 128 have the same longitudinal direction, that is, a direction D perpendicular to the rotation axis A1 on the plane P. In other embodiments, the reinforcement structures 128 may take other suitable forms, and the disclosure is not limited thereto. Moreover, in the direction D, a width W1 of the fracture 128a is, for example, greater than a width W2 of the shaft portion 126, such that the fracture 128a is wide enough to effectively reduce the structural strength of the frame portion 124 in the position corresponding to the shaft portion 126. In addition, orthogonal projections of the shaft portion 126 and the fracture 128a on the plane P are, for example, symmetrical about the rotation axis A1.

In the embodiment, the frame portion 124 has an outer edge 124a and an inner edge 124b opposite to each other. The shaft portion 126 is connected to the outer edge 124a of the frame portion 124. The reinforcement structure 128 is located on the inner edge 124b of the frame portion 124, instead of being located on the outer edge 124a of the frame portion 124. Furthermore, the fracture 128a is located on the inner edge 124b of the frame portion 124, instead of being located on the outer edge 124a of the frame portion 124. In other embodiments, the reinforcement structure 128 may be located in other suitable positions on the frame portion 124, and the disclosure is not limited thereto.

The driving component 140 of the embodiment includes a coil 142 and a magnet 144. The coil 142 and the magnet 144 are disposed on the base 130 and the frame portion 124 respectively, corresponding to each other. In the embodiment in FIG. 2, the coil 142 is located on the base 130 and the magnet 144 is located on the frame portion 124. However, in other embodiments, the coil 142 may be located on the frame portion 124, and the magnet 144 may be located on the base 130. In addition, in other embodiments, the driving component may take other suitable forms, and the disclosure is not limited thereto.

In the embodiment, the shaft portion 126 is disposed on two opposite sides of the frame portion 124 having a rectangular shape. However, the disclosure is not limited thereto. In other embodiments, the shaft portion 126 may be disposed on two opposite corners (vertices) of the frame portion 124 having a rectangular shape, and the positions of the reinforcement structure 128 and the fracture 128a correspond to the position of the shaft portion 126.

Figure 5:
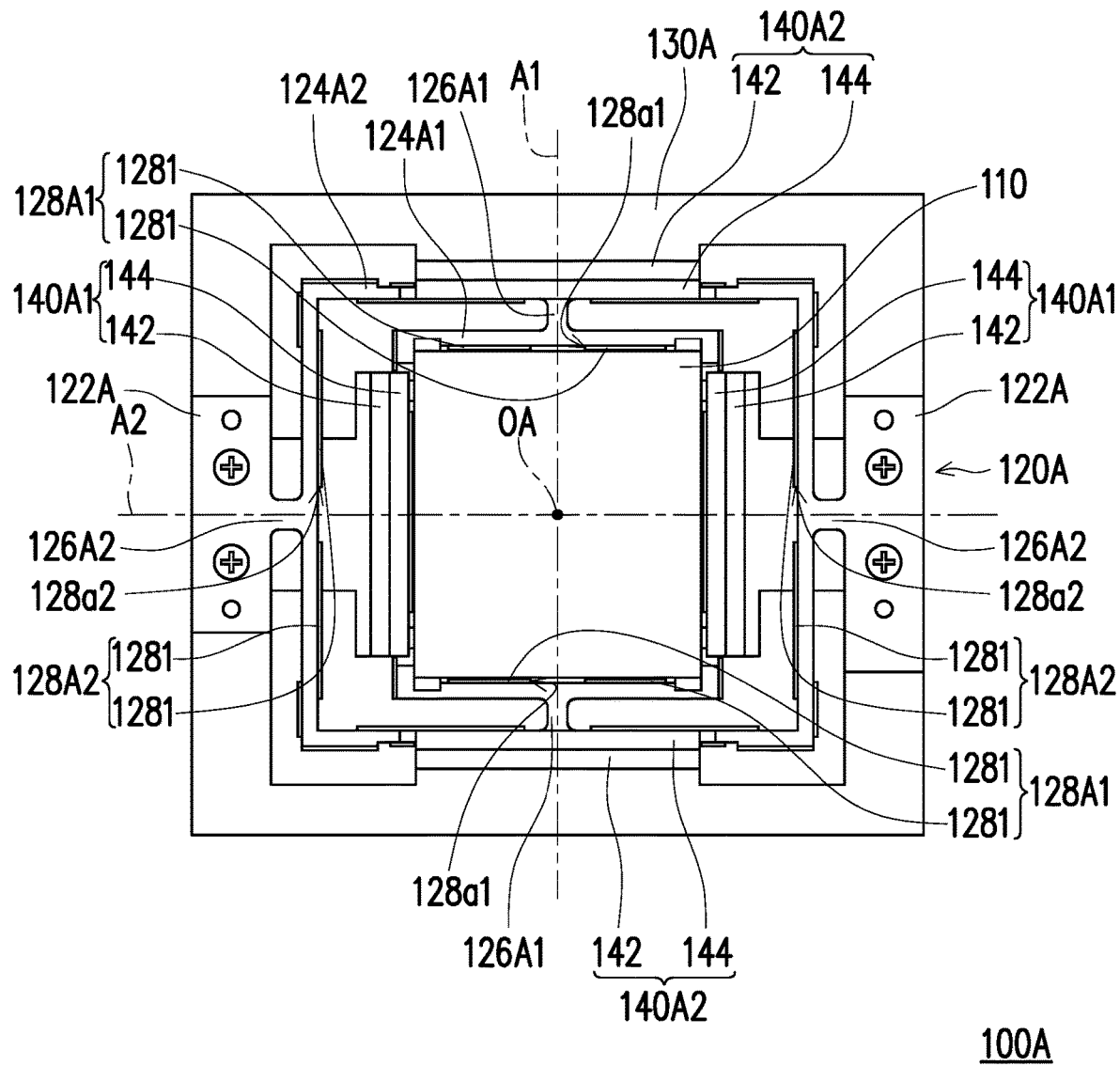
FIG. 5 is a top view of an optical module according to another embodiment of the disclosure.
Figure 6:
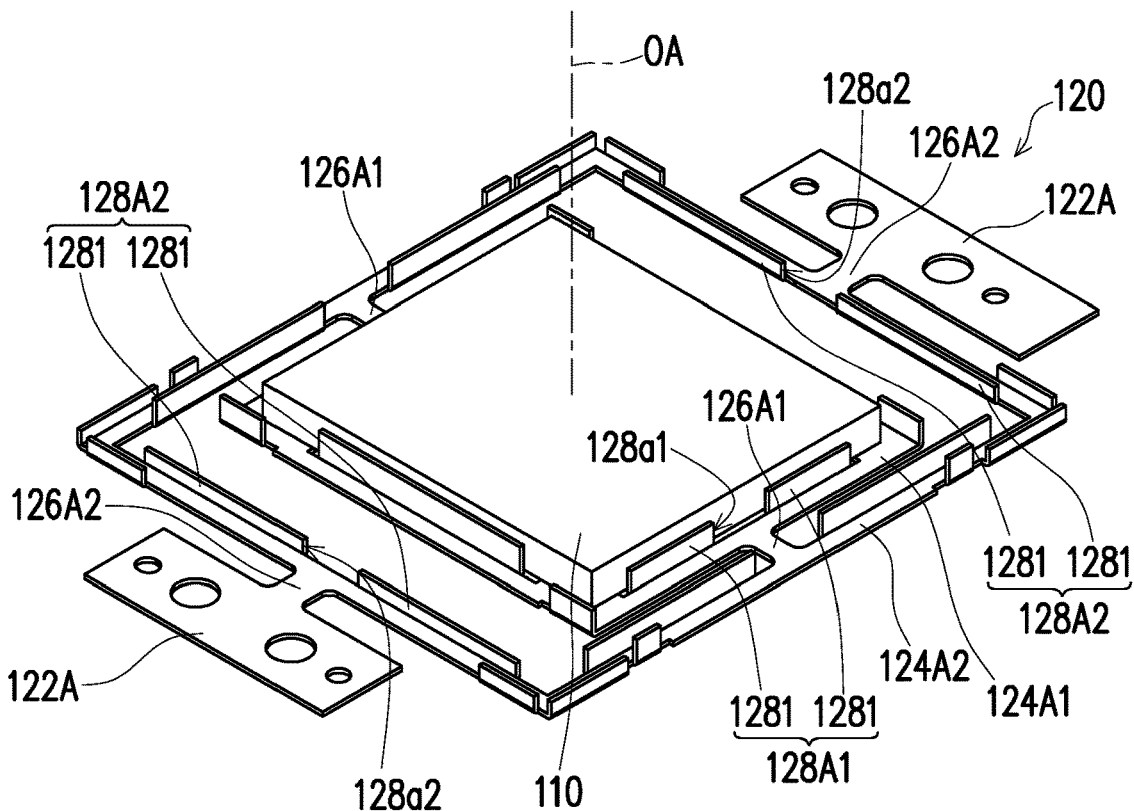
FIG. 6 is a perspective view of a frame body and an optical element of FIG. 5.
Figure 7:
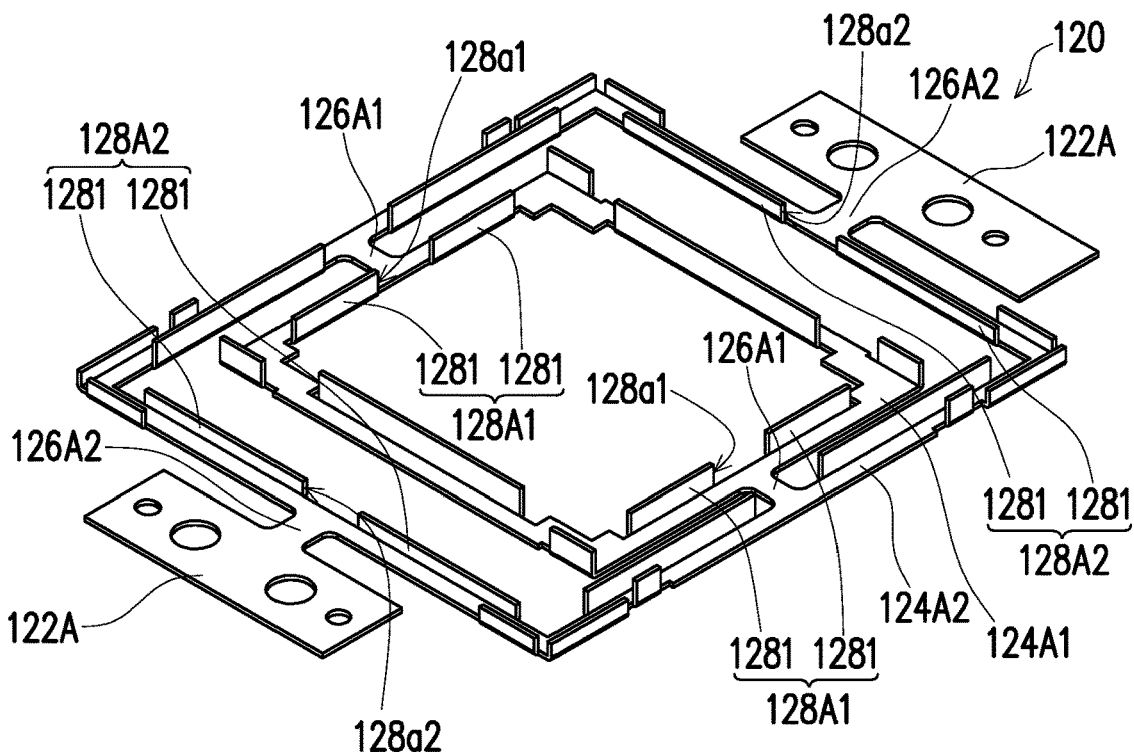
FIG. 7 is a perspective view of the frame body of FIG. 6.

FIG. 5 is a top view of an optical module according to another embodiment of the disclosure. FIG. 6 is a perspective view of a frame body and an optical element of FIG. 5. FIG. 7 is a perspective view of the frame body of FIG. 6. An optical module 100A in FIG. 5 to FIG. 7 is different from the optical module 100 in FIG. 2 to FIG. 4 in that a frame body 120A of the optical module 100A has multiple frame portions, including a first frame portion 124A1 and a second frame portion 124A2, as well as multiple shaft portions, including two first shaft portions 126A1 and two second shaft portions 126A2. There are multiple driving components, including two first driving components 140A1 and two second driving components 140A2. There are multiple reinforcement structures, including a first reinforcement structure 128A1 and a second reinforcement structure 128A2.

In detail, in the embodiment shown in FIG. 5 to FIG. 7, the optical element 110 is disposed in the first frame portion 124A1. The first shaft portions 126A1 are connected between the first frame portion 124A1 and the second frame portion 124A2. The second shaft portions 126A2 are connected between the second frame portion 124A2 and a fixing portion 122A. The fixing portion 122A is connected to a base 130A. An axial direction (i.e., the rotation axis A1 passing through the two first shaft portions 126A1) of the first shaft portions 126A1 is different from an axial direction (i.e., a rotation axis A2 passing through the two second shaft portions 126A2) of the second shaft portions 126A2. Furthermore, in the embodiment, the axial direction (i.e., the rotation axis A1) of the first shaft portions 126A1 is, for example, perpendicular to the axial direction (i.e., the rotation axis A2) of the second shaft portions 126A2. The coil 142 and the magnet 144 of the first driving components 140A1 are disposed on the base 130A and the first frame portion 124A1 respectively, corresponding to each other. The coil 142 and the magnet 144 of the second driving components 140A2 are disposed on the base 130A and the second frame portion 124A2 respectively, corresponding to each other. In other embodiments, the coil 142 and the magnet 144 may switch positions with each other.

The first reinforcement structure 128A1 is connected to the first frame portion 124A1 and includes two sections 1281 arranged at intervals. A fracture 128a1 is formed between the two sections 1281 of the first reinforcement structure 128A1. The position of the fracture 128a1 corresponds to the first shaft portions 126A1. The second reinforcement structure 128A2 is connected to the second frame portion 124A2 and includes two sections 1281 arranged at intervals. A fracture 128a2 is formed between the two sections 1281 of the second reinforcement structure 128A2. The position of the fracture 128a2 corresponds to the second shaft portions 126A2.

The disposition of the first reinforcement structure 128A1 and the second reinforcement structure 128A2 may enhance the structural strength of the first frame portion 124A1 and the second frame portion 124A2 such that deformation is concentrated at the first shaft portions 126A1 and the second shaft portions 126A2 during operation of the frame body 120A. Accordingly, the optical module 100A has good operation stability and response speed. Additionally, as described above, the first reinforcement structure 128A1 and the second reinforcement structure 128A2 respectively have the fracture 128a1 that correspond to the first shaft portions 126A1 and the fracture 128a2 that correspond to the second shaft portions 126A2. In this way, the structural strength of the first frame portion 124A1 in the position corresponding to the first shaft portions 126A1 and the structural strength of the second frame portion 124A2 in the position corresponding to the second shaft portions 126A2 avoid becoming too high compared with the first shaft portions 126A1 and the second shaft portions 126A2, thus avoiding stress concentration on the first shaft portions 126A1 and the second shaft portions 126A2 during operation of the frame body 120A. Therefore, the first shaft portions 126A1 and the second shaft portions 126A2 are less prone to fatigue damage due to excessive stress. The other details of the structural design of the first reinforcement structure 128A1, the second reinforcement structure 128A2 and the fractures 128a1, 128a2 thereof are the same or similar to those of the reinforcement structure 128 and the fracture 128a, and therefore will not be described herein.

Figure 8:
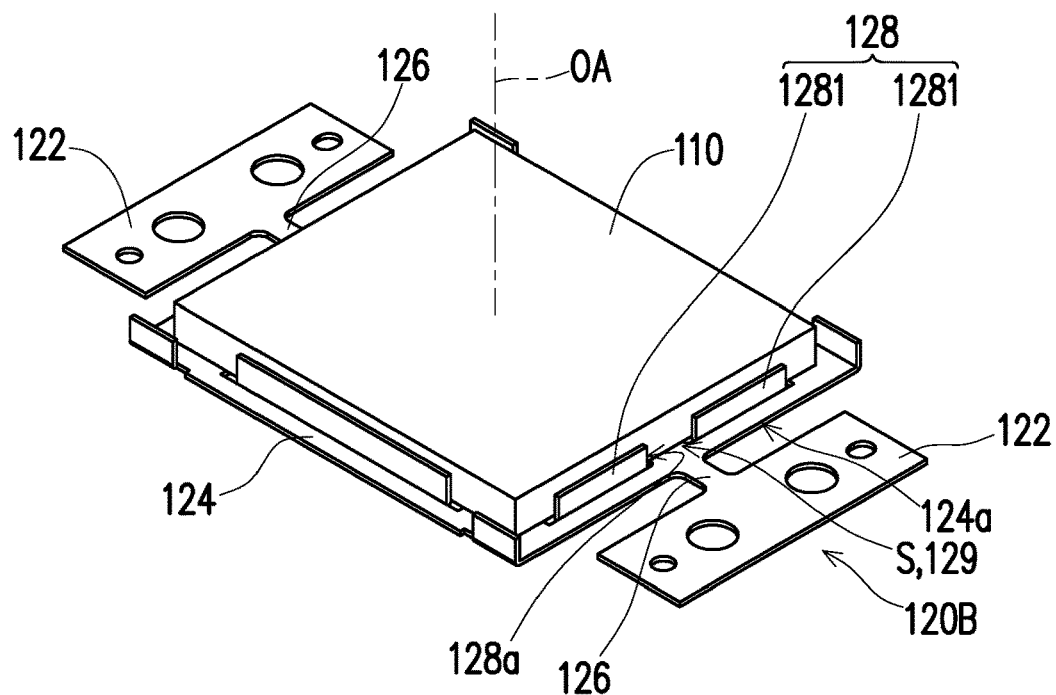
FIG. 8 is a perspective view of a frame body and an optical element according to another embodiment of the disclosure.
Figure 9:
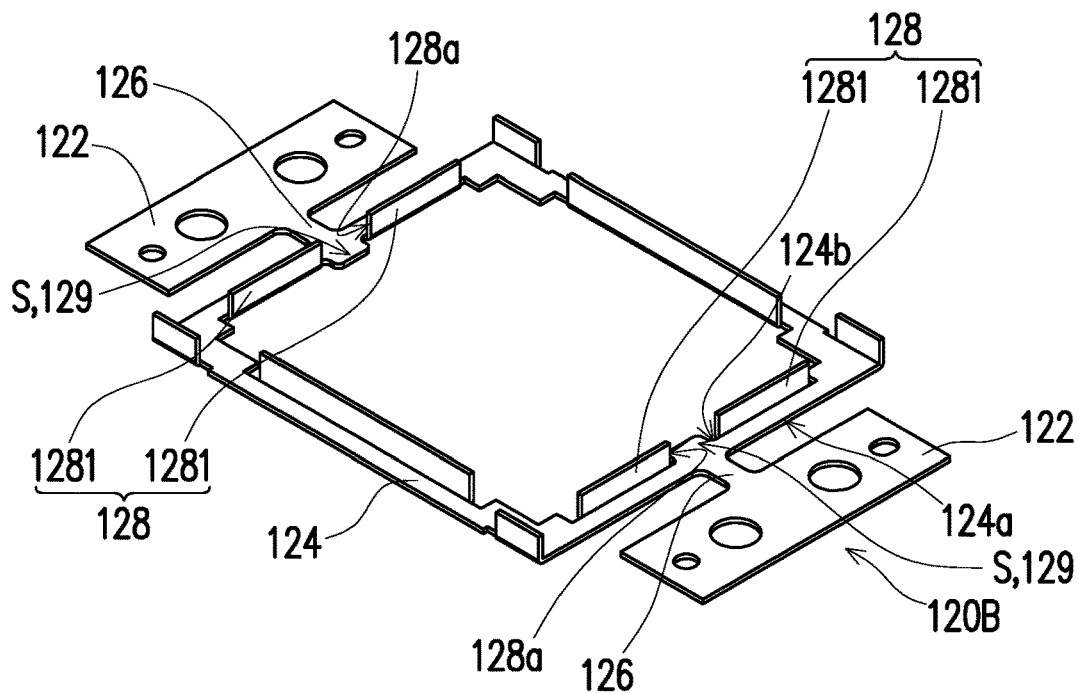
FIG. 9 is a perspective view of the frame body of FIG. 8.

FIG. 8 is a perspective view of a frame body and an optical element according to another embodiment of the disclosure. FIG. 9 is a perspective view of the frame body of FIG. 8. The difference between the embodiment shown in FIG. 8 and FIG. 9 and the embodiment shown in FIG. 3 and FIG. 4 is that a frame body 120B in FIG. 8 and FIG. 9 further includes at least one tongue portion 129, which is, for example, two tongue portions 129. The shaft portion 126 and the tongue portion 129 are connected to the outer edge 124a and the inner edge 124b of the frame portion 124 respectively. The position of the tongue portion 129 corresponds to the fracture 128a, which may further enhance the structural strength of the shaft portions 126 and avoid stress concentration on the shaft portion 126. In addition, the tongue portion 129 has a supporting surface S perpendicular to the optical axis OA of the optical element 110. The optical element 110 leans against and is glued to the supporting surface S to be firmly fixed to the frame portion 124.

Figure 10:
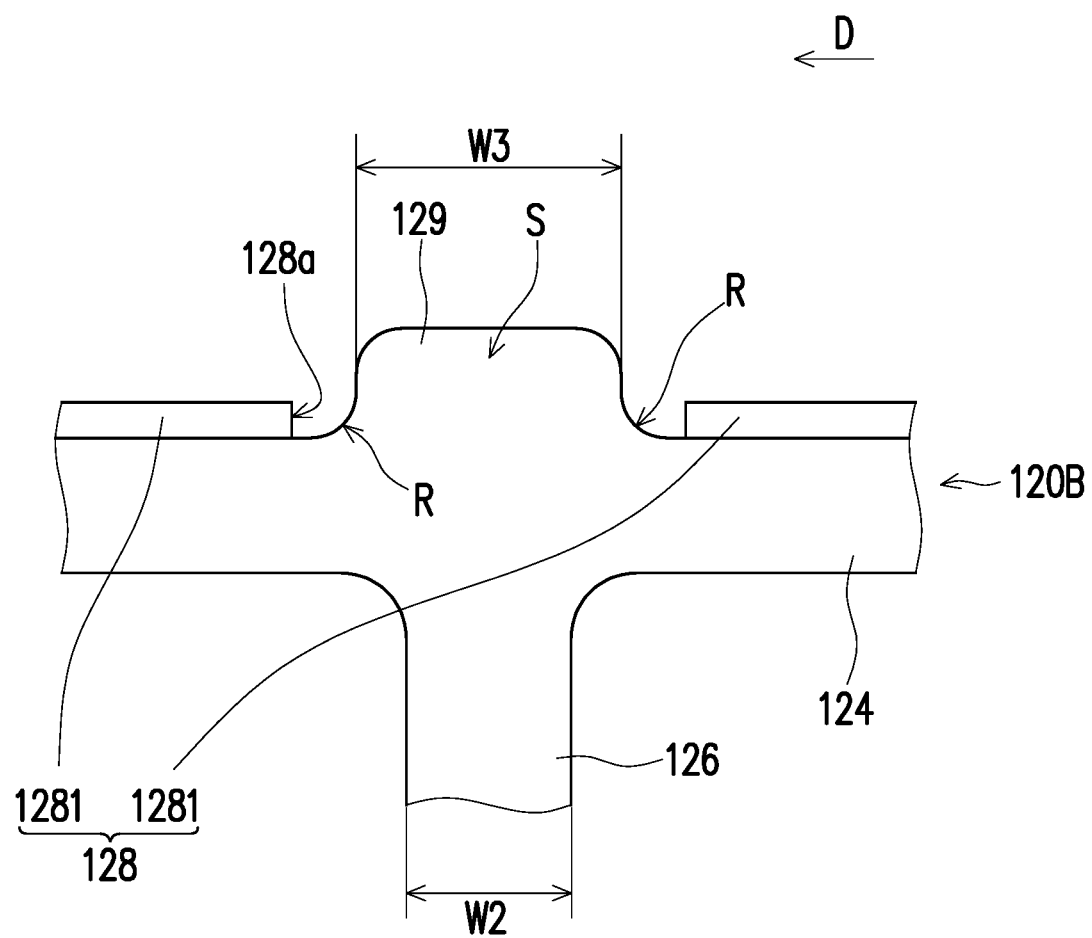
FIG. 10 is a partial top view of the frame body of FIG. 9.

FIG. 10 is a partial top view of the frame body of FIG. 9. With reference to FIG. 10, in the direction D, a width W3 of the tongue portion 129 is greater than the width W2 of the shaft portion 126, such that the tongue portion 129 is wide enough to effectively enhance the structural strength of the shaft portion 126, and the tongue portion 129 can stably carry the optical element 110. In addition, the frame body 120B forms a rounded corner R at a junction between the tongue portion 129 and the frame portion 124 and thus may avoid stress concentration at the junction between the tongue portion 129 and the frame portion 124.

Figure 11:
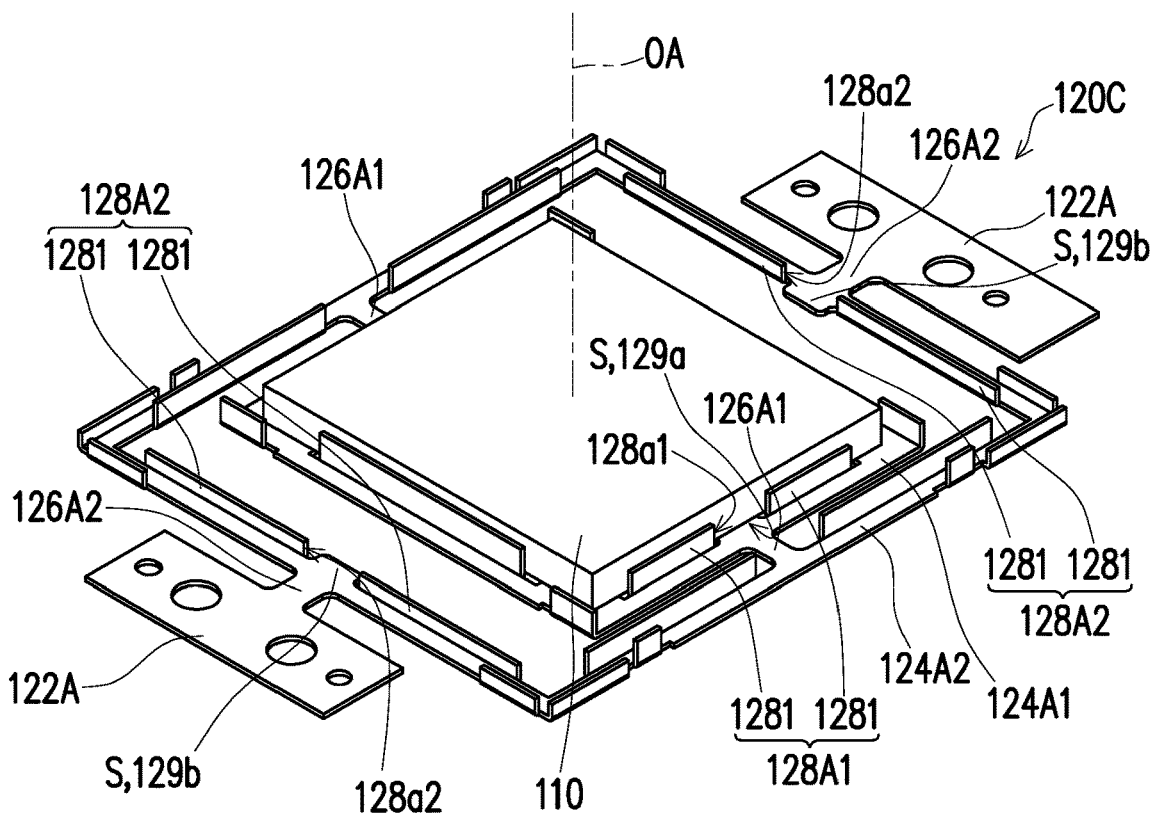
FIG. 11 is a perspective view of a frame body and an optical element according to another embodiment of the disclosure.
Figure 12:
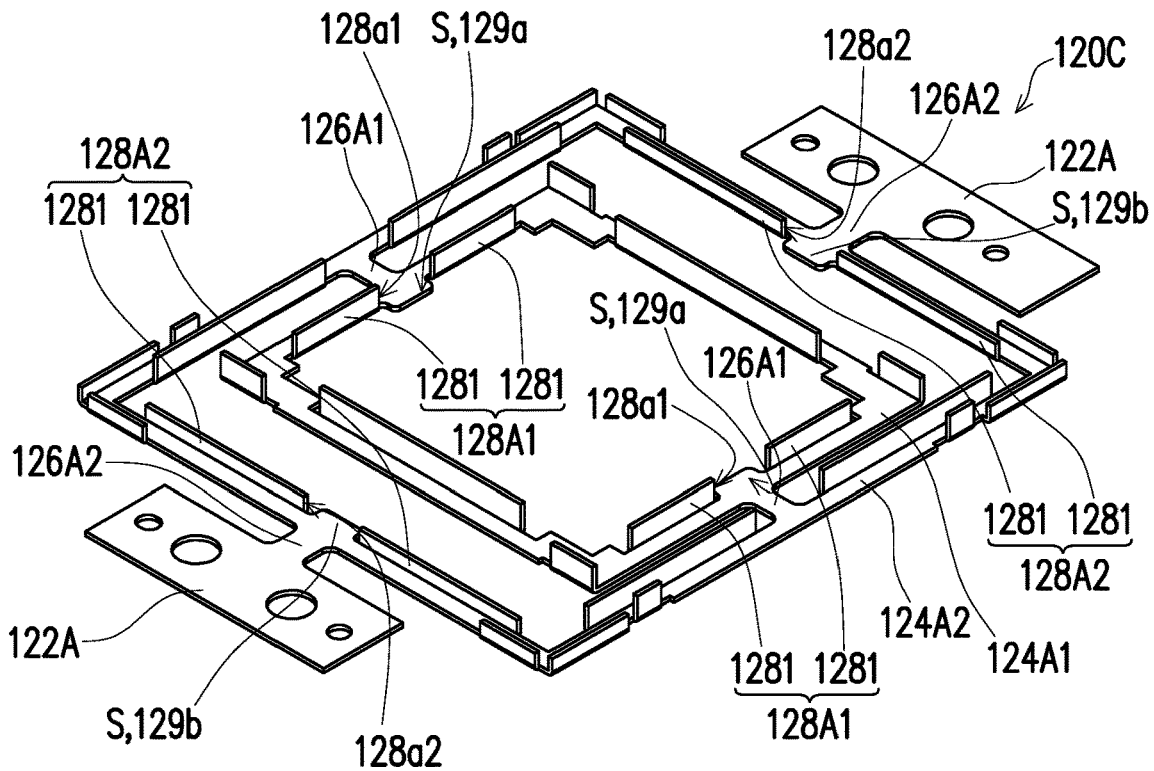
FIG. 12 is a perspective view of the frame body of FIG. 11.

FIG. 11 is a perspective view of a frame body and an optical element according to another embodiment of the disclosure. FIG. 12 is a perspective view of the frame body of FIG. 11. The difference between the embodiment shown in FIG. 11 and FIG. 12 and the embodiment shown in FIG. 6 and FIG. 7 is that a frame body 120C in FIG. 11 and FIG. 12 further includes two tongue portions 129a and two tongue portions 129b. The tongue portions 129a and the tongue portions 129b are connected to the first frame portion 124A1 and the second frame portion 124A2 respectively. The positions of the tongue portions 129a and the tongue portions 129b correspond to the fracture 128a1 and the fracture 128a2 respectively, which may further enhance the structural strength of the first shaft portion 126A1 and the second shaft portion 126A2 and avoid stress concentration on the first shaft portion 126A1 and the second shaft portion 126A2. In addition, the tongue portion 129a has the supporting surface S perpendicular to the optical axis OA of the optical element 110. The optical element 110 leans against and is glued to the supporting surface S to be firmly fixed to the first frame portion 124A1. The other details of the structural design of the tongue portion 129a and the tongue portion 129b are the same or similar to those of the tongue portion 129, and therefore will not be described herein.

Figure 13:
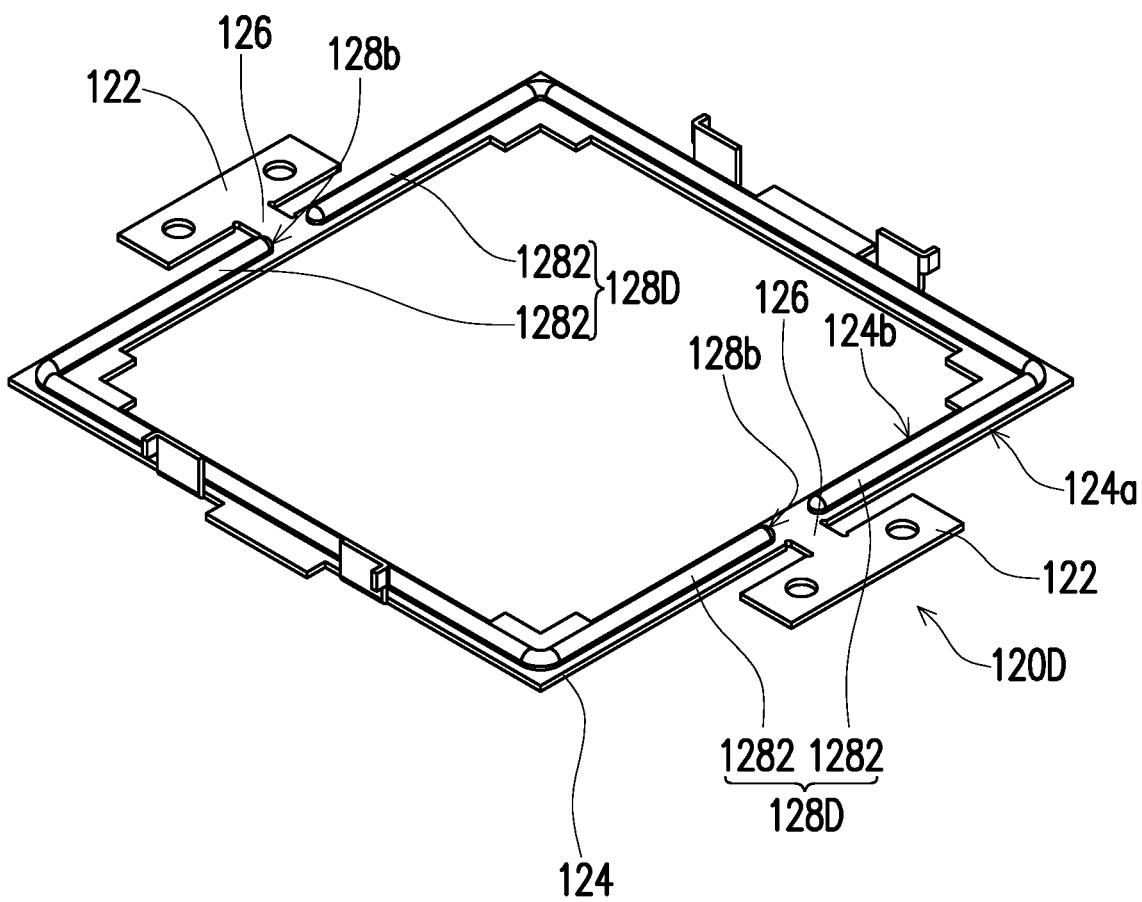
FIG. 13 is a perspective view of a frame body according to another embodiment of the disclosure.

FIG. 13 is a perspective view of a frame body according to another embodiment of the disclosure. The difference between the embodiment shown in FIG. 13 and the embodiment shown in FIG. 4 is that in a frame body 120D of FIG. 13, a reinforcement structure 128D is a convex hull and is located between the inner edge 124b and the outer edge 124a of the frame portion 124. The disposition and effects of a fracture 128b of the reinforcement structure 128D are the same or similar to those of the fracture 128a of the embodiment shown in FIG. 4, and therefore will not be described herein. The reinforcement structure 128D in the form of a convex hull as shown in FIG. 13 may be applied to any of the aforementioned embodiments. In addition, in other embodiments, the reinforcement structure 128D in the form of a convex hull as shown in FIG. 13 may coexist with the reinforcement structure in the form of a folding wall in any of the aforementioned embodiments.

In summary, in the optical module of the disclosure, the frame portion of the frame body has the reinforcement structure. Thereby, the structural strength of the frame portion is increased and deformation is concentrated at the shaft portion of the frame body during operation of the frame body, so that the optical module can have good operation stability and response speed. Moreover, the reinforcement structure has the fracture corresponding to the shaft portion, such that the structural strength of the frame portion in the position corresponding to the shaft portion avoids becoming too high compared with the shaft portion, thus avoiding stress concentration on the shaft portion during operation of the frame body. Therefore, the shaft portion is less prone to fatigue damage due to excessive stress. In addition, the tongue portion may further be disposed on the frame portion in the position corresponding to the shaft portion, so that the structural strength of the shaft portion is further increased, and the optical element may be carried by the tongue portion.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An optical module, the optical module comprising a frame body and an optical element, wherein
the frame body comprises at least one fixing portion, at least one frame portion, at least one shaft portion, and at least one reinforcement structure, wherein the at least one frame portion is connected to the at least one fixing portion through the at least one shaft portion, the at least one reinforcement structure is connected to the at least one frame portion and forms at least one fracture, and a position of the at least one fracture corresponds to the at least one shaft portion; and
the optical element is disposed in the at least one frame portion,
wherein the at least one frame portion has an outer edge and an inner edge opposite to each other, the inner edge is closer to the optical element than the outer edge, the frame body further comprises at least one tongue portion, the at least one tongue portion is located at the inner edge, and a position of the at least one tongue portion corresponds to the at least one fracture,
wherein a width of the at least one tongue portion is smaller than a width of the fracture.

2. The optical module according to claim 1, wherein the at least one shaft portion is located at the outer edge.

3. The optical module according to claim 2, wherein the at least one tongue portion has a supporting surface perpendicular to an optical axis of the optical element, and the optical element leans against the supporting surface.

4. The optical module according to claim 3, wherein the optical element is glued to the supporting surface.

5. The optical module according to claim 2, wherein the frame body forms at least one rounded corner at a junction between the at least one tongue portion and the at least one frame portion.

6. The optical module according to claim 1, wherein the width of the at least one tongue portion is greater than a width of the at least one shaft portion.

7. The optical module according to claim 1, wherein the width of the at least one fracture is greater than a width of the at least one shaft portion.

8. The optical module according to claim 1, wherein the at least one frame portion is configured to deflect around a rotation axis through the at least one shaft portion, the rotation axis is located on a plane perpendicular to an optical axis of the optical element, and orthogonal projections of the at least one shaft portion and the at least one fracture on the plane are symmetrical about the rotation axis.

9. The optical module according to claim 1, wherein the at least one reinforcement structure extends out from the at least one frame portion along a direction parallel to an optical axis of the optical element.

10. The optical module according to claim 1, wherein the at least one reinforcement structure comprises two sections arranged at intervals, and the at least one fracture is formed between the two sections.

11. The optical module according to claim 10, wherein the two sections have the same longitudinal direction.

12. The optical module according to claim 1, wherein the at least one shaft portion is connected to the outer edge, and the at least one reinforcement structure is not located on the outer edge.

13. The optical module according to claim 12, wherein the at least one reinforcement structure is located on the inner edge or between the inner edge and the outer edge.

14. The optical module according to claim 1, wherein the at least one reinforcement structure comprises at least one folding wall or at least one convex hull.

15. The optical module according to claim 1, wherein the at least one frame portion comprises a first frame portion and a second frame portion, the at least one shaft portion comprises at least one first shaft portion and at least one second shaft portion, the optical element is disposed in the first frame portion, the at least one first shaft portion is connected between the first frame portion and the second frame portion, the at least one second shaft portion is connected between the second frame portion and the at least one fixing portion, and an axial direction of the at least one first shaft portion is different from an axial direction of the at least one second shaft portion.

16. The optical module according to claim 1, further comprising a base, wherein the base surrounds the frame body, and the at least one fixing portion is connected to the base.

17. The optical module according to claim 16, further comprising at least one driving component, wherein the at least one driving component is disposed on the base and the at least one frame portion, and the at least one frame portion is configured to deflect relative to the base by a magnetic force generated by the at least one driving component.

18. A projection device, the projection device comprising a light source, a light valve, a projection lens, and an optical module, wherein
the light source is configured to provide an illumination beam;
the light valve is configured to convert the illumination beam into an image beam;
the projection lens is configured to project the image beam out of the projection device; and
the optical module is disposed between the light valve and the projection lens and comprises a frame body and an optical element, wherein
the frame body comprises at least one fixing portion, at least one frame portion, at least one shaft portion, and at least one reinforcement structure, wherein the at least one frame portion is connected to the at least one fixing portion through the at least one shaft portion, the at least one reinforcement structure is connected to the at least one frame portion and forms at least one fracture, and a position of the at least one fracture corresponds to the at least one shaft portion; and
the optical element is disposed in the at least one frame portion and located on a transmission path of the image beam,
wherein the at least one frame portion has an outer edge and an inner edge opposite to each other, the inner edge is closer to the optical element than the outer edge, the frame body further comprises at least one tongue portion, the at least one tongue portion is located at the inner edge, and a position of the at least one tongue portion corresponds to the at least one fracture,
wherein a width of the at least one tongue portion is smaller than a width of the fracture.

19. The projection device according to claim 18, wherein the at least one shaft portion is located at the outer edge.

20. The projection device according to claim 19, wherein the at least one tongue portion has a supporting surface, the supporting surface is perpendicular to an optical axis of the optical element, and the optical element leans against the supporting surface.

* * * * *